Figure 4:
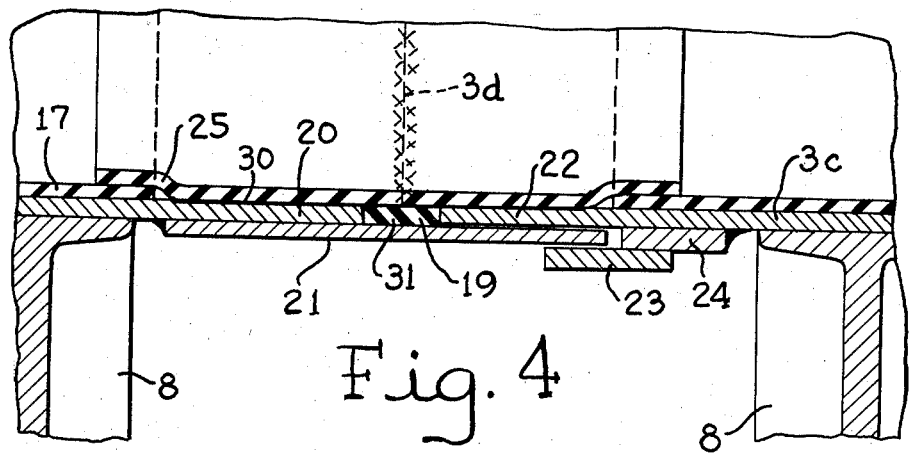

Oct. 28, 1958     J. W. DAHM     2,858,038
TANK CONSTRUCTION AND EXPANSION JOINT THEREFOR
Filed Dec. 16, 1954     2 Sheets-Sheet 1
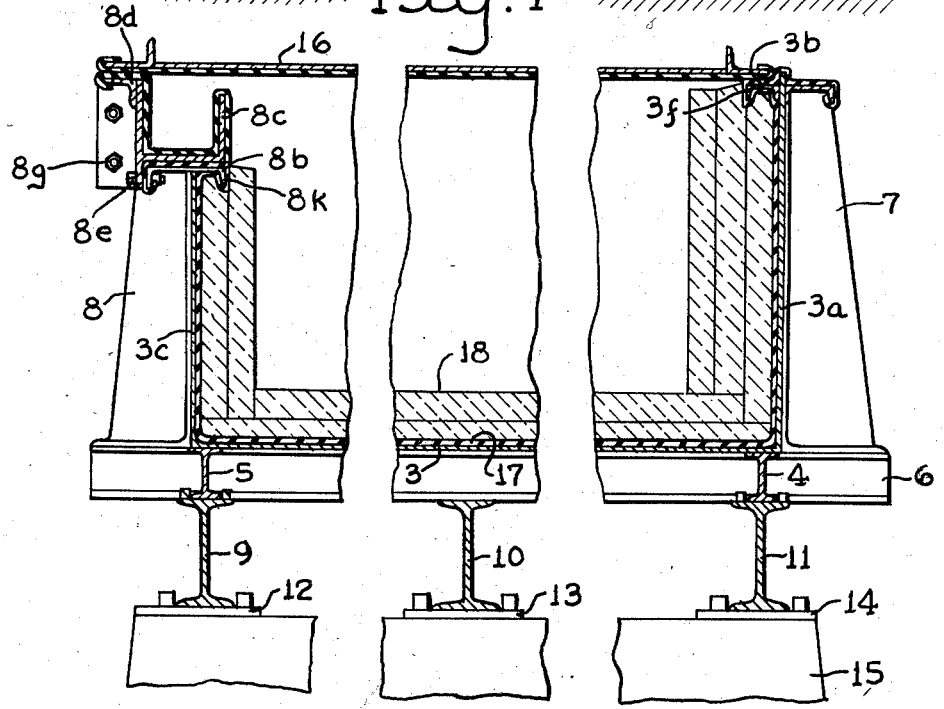
INVENTOR.
JOHN W. DAHM Oct. 28, 1958   J. W. DAHM   2,858,038
TANK CONSTRUCTION AND EXPANSION JOINT THEREFOR
Filed Dec. 16, 1954   2 Sheets-Sheet 2

INVENTOR.
JOHN W. DAHM
BY D. P. Mullaney
atty.

ated Oct. 28, 1958

United States Patent Office

2,858,038
TANK CONSTRUCTION AND EXPANSION JOINT THEREFOR

John W. Dahm, Oak Park, Ill., assignor to Acme Steel Company, Chicago, Ill., a corporation of Illinois Application December 16, 1954, Serial No. 475,769

8 Claims. (Cl. 220—5)

This invention relates to an improved construction for pickling tanks used for the processing of continuous lengths of material such as strip steel and to an improved thermal expansion joint embodied therein.

Presently, the most widely accepted construction for pickling tanks used to treat long continuous lengths of strip steel with acid has been a channel shaped rubber lined metal casing, the metal usually being steel in sheet form. Also, the inner portions of the tank on the outside surface of the rubber liner are lined with brick for purposes of insulation as well as to prevent destruction of the rubber liner by contact with the moving strip or other foreign objects. In order to properly contain the acid fumes within the tank and to further assist in preventing heat loss, all upward openings in the tanks are covered with lids or covers which ordinarily rest in place. However, in spite of the brick insulation and covers, it is not unusual to have a pronounced temperature gradient, because of the hotter acid rising, between the upper and lower portions of the acid within the tank, thus, producing a temperature differential in the steel walls from top to bottom. Because of this temperature difference which is transferred to the walls and bottom of the tank, these tank portions expand and contract during heating and cooling, more or less, in different parts. For example, the upper portions of the tank, where the temperature is greater, expand more than the lower portions so that the tank walls gradually bow and this bowing condition is aggravated and becomes greater as the tank becomes older. This bowing occurs even though reinforcements are provided for supporting the walls of the tank and when the bowing becomes great enough, as it usually does, the fitted tank lids soon have to be replaced before they fall into the acid bath. This may at first seem to be rather unimportant since it would seem only necessary to replace the covers when this occurs. But, in a 200 foot length by approximately 8 foot wide tank, cover replacement costs at least $15,000 to $20,000 for even the most inexpensive covers. In addition to cover replacement, when the tank walls bow, the refractory wall lining is caused to separate from the tank walls to result in destruction of this material and oftentimes it falls to the bottom of the tank. Replacement and repair of this lining is also inconvenient and relatively expensive. Therefore, it is the principal object of this invention to provide an improved pickling tank composed of sections having expansion joints between them which, even though the walls of the tank expand, provide additional room to take up the expansion and thereby prevent bowing. It is still another object of this invention to provide an efficient expansion joint for a pickling tank which is very simple in construction and yet very effective in result. In pickling tanks where no expansion joint is provided, it is necessary to weld the sections of the tank together along the bottom and also both of the side walls which entails a considerable amount of welding and difficulty in welding while attempting to keep abutting portions of the thin tank walls in alignment. It is, therefore, another object of this invention to provide an expansion joint which decreases the amount of welding required and thereby reduces the cost of manufacturing the tank.

Other details, objects and advantages of the invention will become apparent from the following description of a present preferred embodiment thereof.

Figure 3:
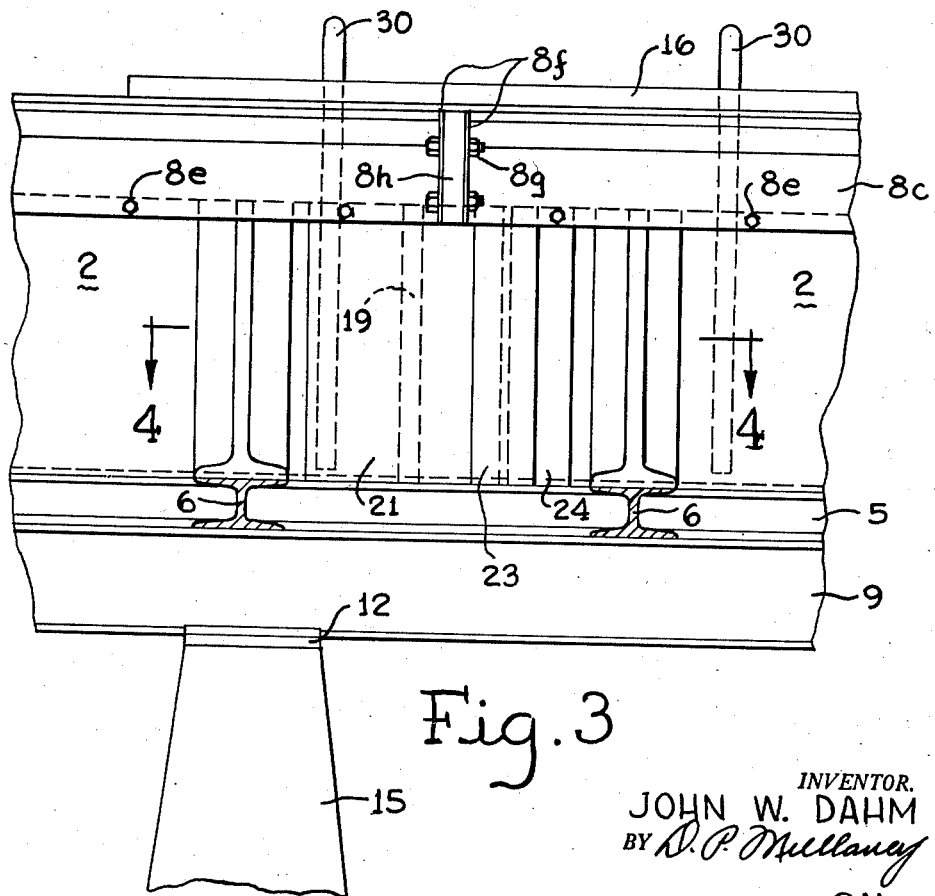

In the accompanying drawings there is shown a present preferred embodiment of the invention, in which Fig. 1 shows a side elevation of a portion of a pickling tank joined together in sections and embodying a preferred form of the telescopic expansion joint of this invention; and Fig. 2 shows a cross-sectional view of the pickling tank taken on the line 2—2 of Fig. 1; and Fig. 3 shows an enlarged side elevation of a portion of the pickling tank shown in Fig. 1; and Fig. 4 shows a partial cross-sectional view of a portion of a side wall of the pickling tank taken on line 4—4 of Fig. 3.

A preferred embodiment of the tank 1 comprises U shaped sheet metal sections 2 which are placed end to end and transversely welded together along their bottom walls 3 along a line 3d as shown in Fig. 4. This bottom wall 3 of each section 2 is connected to two side walls 3a and 3c which extend normal thereto and vertically upward. These U shaped sections 2 rest on and are welded to longitudinally extending I-beams 4 and 5 and transversely extending I-beams 6. Extending upwardly from near the outer ends of the transverse I-beams 6 are two vertical supports 7 and 8 which are welded to and keep the tank sections 2 in lateral alignment. These I-beams 4, 5 and 6 are longitudinally slidable and supported on three larger I-beams 9, 10 and 11 which are in turn longitudinally slidable and resting on plates 12, 13 and 14 fixed to the upper surfaces of concrete support members 15. The upper margin of the side wall 3a of each tank section 2 is provided with a shoulder 3b on which rests an edge of a tank cover 16. The upper margin of the other side wall 3c abuts a beam 8b which is the upper part of the support member 8. Also mounted on the support member 8 and joined to the member 8b by bolts 8e is a channel 8c which is provided with an upper shoulder 8d on which rests a portion of the cover 16. This channel 8c acts as an exhaust duct for acid fumes and can extend the entire length of the tank to an exhaust port. The entire inner portions of the tank are completely covered with a rubber lining 17 for making the tank leakproof and this includes the bottom, the walls, the exhaust duct 8c and the cover. Even though the preferred embodiment of the tank shown can be supplied with an acid resistant rubber liner 17 such as natural rubber for resisting sulfuric acid in a pickling operation, the tank could just as well be lined with the same or other elastic material for use with other hot fluids. Also, in order to protect the rubber lining 17 from damage because of moving strip and other objects and to provide thermal insulation, a refractory material 18 is also provided as a liner over the rubber liner 17 and covers the two side walls 3a and 3c and the bottom 3. The beams 3b and 8b are both provided with lips 3f and 8k which engage upper portions of the refractory lining 18 and assist in holding it in position. Further, longitudinal expansion joints, not shown, can be provided at intervals along the refractory lining by leaving separations between portions of the refractory material and filling them with sponge rubber to prevent extraneous material from filling these separations or gaps.

As especially shown in Fig. 4, and as already mentioned, the tank sections 2 are joined together by welding along lines 3d to join together the bottom 3 of each section. Also, the side walls 3a and 3c are shortened slightly so that they are separated by a gap 19 which may be, for example, about 1 inch long. This gap 19 may be filled with a soft rubber piece 31. The end 20 of a side wall 3c is provided with a plate 21 which is welded thereto and this plate 21 projects beyond the end 20 of this side wall 3c where it overlaps the end 22 of an adjacent side wall 3c in a telescoping manner. Also, to further retain the plate 21, two other plates 23 and 24 are fastened to the end 22 of side wall 3c with plate 23 lying over a portion of the end of plate 21. This telescoping arrangement permits plate 21 to slide over the end 22. In order to keep the tank leakproof, a laterally extending joining rubber sheet 25 is provided. This joining member 25 overlaps the rubber liner 17 on adjacent end portions of the liner section and is separated from the tank walls 3a and 3c by pieces of holland cloth 30. During assembly, all of the rubber liners 17 are glued to the metal tank walls in order to hold them in place. With this construction, when there is a temperature gradient from top to bottom of the tank, the walls of the tank sections which expand progressively more closer to their upper portions are free to expand without producing any bowing as is common when no expansion joint is provided. Since the expansion in the walls is always relative to the expansion in the bottom of the tank which is always coldest, it is not necessary to physically separate the bottom portions of the tank sections and so they may be welded together as already indicated along the line 3d. Of course, though not necessary, the telescoping construction could also be used on a portion of the bottom of the tank provided remaining portions of adjacent abutting sections are welded together. The principal reason for having the ends of the bottom walls 3 welded together for at least a portion of their width is to insure that the tank sections draw together again while contracting upon cooling. If the telescopic joint was included along the entire bottom widths as well as in the side walls, the tank would elongate by expansion upon heating but would not be able to shorten again upon cooling and contraction. Since the movement of the tank sections due to expansion and contraction will occur in the gap 19 region, the holland cloth 30 is inserted between the liner 25 and the end portions 20 and 22 of the walls 3a or 3c so that the rubber liner 25 can expand and contract over a greater length which will not readily occur if the liner 25 is glued directly to the tank walls as is the liner 17.

In order to permit the exhaust duct 8c to shift during expansion and contraction of the tank walls 3c, it is supplied in short lengths corresponding in length to the tank sections 2 and provided with flanges 8f which are held together by bolts 8g. A thick pad of soft rubber 8h is placed between these flanges to provide for take up during expansion and contraction of the tank. Because the liquid level of the acid in the tank is never the height of the exhaust duct 8c, such an expansion joint is adequate, though not so for the remainder of the tank.

In order to heat the fluid within the tank, steam is applied by a conventional means directly to the fluid at the bottom of the tank through lead pipes 30 which extend from a steam source, up over the side walls of the tank and down through openings in the covers 16 to the bottom of the tank. The ends of these lead pipes 30 which extend to the bottom of the tank are ordinarily connected to steam jets, not shown, which disperse jets of steam laterally through the fluid in the bottom of the tank.

Since the material cost for providing this expansion joint is very small and because less welding labor is required to provide the joint during assembly of the tank, the total cost is less. Consequently, since this type of joint obviates the need for cover replacement and refractory lining repair, the life of a tank is considerably lengthened and the overall savings is quite large.

While a present preferred embodiment of the invention has been shown, it should be understood that the invention is not limited thereto, but may embody various other constructions without departing from the scope of the following claims.

I claim:

1. A channel shaped tank comprising a continuous bottom wall and side walls extending upwardly therefrom, said side walls being formed of separated lengths, the ends of said lengths having longitudinally slidable overlapping portions.

2. A channel shaped tank comprising a continuous bottom wall and longitudinally discontinuous side walls extending upwardly from said bottom wall, said side walls having longitudinally slidable overlapping portions in the regions of their discontinuity to compensate for expansion and contraction.

3. A tank comprising channel shaped members placed end to end, said members each having a bottom wall and vertical side walls, said bottom walls being joined together continuously at their ends and said side walls being overlapped at their ends for slidable movement relative to each other.

4. A fluid tight tank comprising channel shaped members placed longitudinally end to end, each of said members having a bottom wall and upwardly extending side walls, said members being joined continuously at the ends of said bottom walls and overlapped at the ends of said side walls, all of said walls being provided with an elastic liner.

5. A tank comprising channel shaped members placed longitudinally end to end and slidably resting on a support, said members each having a bottom wall and upstanding side walls, said bottom walls being joined together continuously at their ends, and said side walls being overlapped adjacent their ends to permit slidable movement thereof relative to each other.

6. A heated tank comprising channel shaped members placed longitudinally end to end and slidably resting on a support, said members each having a bottom wall and upstanding side walls, said bottom walls being joined together continuously at portions of their ends, said side walls having laterally offset first ends and straight second ends, said first end of one of said side walls being slidably overlapped with a second end of an adjacent one of said side walls to permit slidable movement thereof relative to each other during thermal expansion and contraction of said tank.

7. A channel shaped tank comprising a continuous bottom wall and side walls extending upwardly therefrom, each of said side walls being formed of aligned separated lengths, the ends of said lengths having offset longitudinally slidable overlapping portions.

8. A tank comprising channel shaped members placed longitudinally end to end and slidably resting on a support, said members each having a bottom wall and upstanding side walls, said bottom walls being rigidly joined together continuously at their ends, and said side walls being overlapped adjacent their ends to permit slidable movement thereof relative to each other.

References Cited in the file of this patent

UNITED STATES PATENTS

| | | |
|---|---|---|
| Re. 4,707 | Munzinger | Jan. 9, 1872 |
| Re. 6,157 | Munzinger | Dec. 1, 1874 |
| 210,324 | Hendrick | Nov. 26, 1878 |
| 949,225 | Ford | Feb. 15, 1910 |
| 1,020,972 | Eustis | Mar. 26, 1912 |
| 1,051,329 | Hibbard | Jan. 21, 1913 |
| 1,709,701 | Althoff | Apr. 16, 1929 |
| 1,842,783 | Hauser | Jan. 26, 1932 |
| 1,899,413 | Fritz | Feb. 28, 1933 |
| 2,131,855 | Hummel | Oct. 4, 1938 |
| 2,140,672 | Gray et al. | Dec. 20, 1938 |
| 2,141,861 | Hahn et al. | Dec. 27, 1938 |
| 2,170,181 | Allen et al. | Aug. 22, 1939 |
| 2,198,331 | Chyle | Apr. 23, 1940 |
| 2,209,290 | Watts | July 23, 1940 |
| 2,321,777 | Schelhammer et al. | June 15, 1943 |

FOREIGN PATENTS

| | | |
|---|---|---|
| 4,248 | Great Britain | A. D. 1903 |